United States Patent
Proulx et al.

(10) Patent No.: US 11,309,677 B2
(45) Date of Patent: Apr. 19, 2022

(54) MULTI-CLAD OPTICAL FIBER WITH DELOCALIZATION OF PEDESTAL MODES

(71) Applicant: Institut National D'Optique, Quebec (CA)

(72) Inventors: Antoine Proulx, Quebec (CA); Vincent Roy, Quebec (CA); Mathieu Boivin, Quebec (CA); Yves Taillon, Quebec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 0 days.

(21) Appl. No.: 17/162,852

(22) Filed: Jan. 29, 2021

(65) Prior Publication Data

US 2021/0242652 A1 Aug. 5, 2021

Related U.S. Application Data

(60) Provisional application No. 62/968,440, filed on Jan. 31, 2020.

(51) Int. Cl.
*H01S 3/067* (2006.01)
*G02B 6/036* (2006.01)

(52) U.S. Cl.
CPC ...... *H01S 3/06733* (2013.01); *G02B 6/03627* (2013.01); *G02B 6/03661* (2013.01); *H01S 3/06716* (2013.01)

(58) Field of Classification Search
CPC ............. H01S 3/06733; H01S 3/06716; G02B 6/03627; G02B 6/03661
See application file for complete search history.

(56) References Cited

U.S. PATENT DOCUMENTS

| | | | |
|---|---|---|---|
| 6,411,762 B1* | 6/2002 | Anthon | C03B 37/01211 385/123 |
| 6,941,053 B2* | 9/2005 | Lauzon | G02B 6/03605 385/126 |
| 7,050,686 B2* | 5/2006 | Farroni | G02B 6/024 382/124 |
| 7,068,900 B2* | 6/2006 | Croteau | G02B 6/03605 385/126 |

(Continued)

OTHER PUBLICATIONS

Bahaa E. A. Saleh, Malvin Carl Teich, Fundamentals of Photonics, Copyright 1991. John Wiley & Sons, Inc. ISBNs: 0-471-83965-5 (Hardback); 0-471-2-1374-8 (Electronic) (Year: 1991).*

(Continued)

*Primary Examiner* — Peter Radkowski
(74) *Attorney, Agent, or Firm* — Crowell & Moring LLP (57) ABSTRACT

A multi-clad optical fiber is provided. The fiber includes, concentrically and radially outwards from the center of the optical fiber, a core doped with at least one rare-earth dopant material, a pedestal cladding structure, an inner cladding and an outer cladding. The pedestal cladding structure includes a pedestal layer having a refractive index smaller than a refractive index of the core, and a raised index layer having a refractive index larger than the refractive index of the pedestal layer. The raised index layer has a thickness and a refractive index which preserve the confinement of the core mode in the core and minimize the overlap of one or more pedestal modes with the core.

15 Claims, 7 Drawing Sheets

(56) References Cited

U.S. PATENT DOCUMENTS

| | | | |
|---|---|---|---|
| 7,412,142 B2* | 8/2008 | Chen | C03B 37/01217 385/123 |
| 7,900,481 B2* | 3/2011 | Gallagher | C03B 37/01211 65/409 |
| 8,731,358 B2* | 5/2014 | Pare | G02B 6/02023 385/126 |
| 9,366,806 B2* | 6/2016 | Taunay | G02B 6/02338 |
| 10,567,080 B2* | 2/2020 | Chamberlain | G02B 6/03644 |
| 10,784,961 B2* | 9/2020 | Chamberlain | H04B 10/2581 |
| 2004/0156607 A1* | 8/2004 | Farroni | G02B 6/024 385/123 |
| 2005/0008311 A1* | 1/2005 | Farroni | G02B 6/024 385/123 |
| 2007/0266738 A1* | 11/2007 | Gallagher | C03B 37/01217 65/393 |
| 2007/0269175 A1* | 11/2007 | Chen | C03B 37/01217 385/125 |
| 2010/0195194 A1* | 8/2010 | Chen | G02B 6/03661 359/341.3 |
| 2011/0194814 A1* | 8/2011 | Fini | G02B 6/03688 385/28 |
| 2019/0007138 A1* | 1/2019 | Chamberlain | H04J 14/04 |
| 2020/0186248 A1* | 6/2020 | Chamberlain | G02B 6/02042 |
| 2021/0075510 A1* | 3/2021 | Chamberlain | H04B 10/2581 |

OTHER PUBLICATIONS

Simakov et al., "Design and experimental demonstration of a large pedestal thulium-doped fibre," *Optic Express*, 23:3 (2015) pp. 3126-3133.

* cited by examiner

MULTI-CLAD OPTICAL FIBER WITH DELOCALIZATION OF PEDESTAL MODES

TECHNICAL FIELD

The technical field generally relates to optical fibers and more particularly concerns a multi-clad optical fiber including a pedestal cladding structure providing a delocalization of propagation modes.

BACKGROUND

Cladding-pumped optical fibers, such as double-clad and triple-clad optical fibers, are used in fiber lasers and amplifiers for a wide range of applications. Cladding-pumped optical fibers generally include a core that carries the light signal, an inner cladding surrounding the core and carrying the pump light, and an outer cladding surrounding the inner cladding. The core, inner cladding and outer cladding are made of materials with different refractive indices, such that the index of the core is higher than that of the inner cladding, which, in turn, is higher than the index of the outer cladding. Both core and inner cladding are typically made of silica glass ($SiO_2$). To provide a gain region, the core is doped with an active dopant material, for example a rare earth such as ytterbium (Yb), erbium (Er) or thulium (Tm). The inner cladding has a large cross-sectional area compared to the core and high numerical aperture. The outer cladding confines the pump light inside the inner cladding and is commonly made of a low-index polymer.

It is known in the art to use optical fibers doped with rare-earth ions such as erbium, ytterbium, etc. to provide efficient laser light amplification. Unprecedented power levels were reported in recent years thanks to the widespread use of multi-emitter laser diode modules for optical pumping of double-clad rare-earth doped fibers. Diffraction-limited laser output from such fibers may be achieved by choosing the core diameter and numerical aperture (NA) so that the fiber supports only the fundamental transverse mode. This requirement is however sometimes difficult to fulfill due to the high concentration of rare-earth dopants (and co-dopants for increasing dopants solubility) needed to achieve good absorption of the pump light.

Various approaches to effectively tame the large index change brought about by index-raising co-dopants such as aluminum are known in the art (see for instance patents U.S. Pat. Nos. 6,411,762, 6,941,053, 7,050,686 and 7,068,900). As for example shown in U.S. Pat. No. 6,941,053 (LAUZON et al.), a so-called pedestal (or inner cladding layer) may be provided surrounding the core so as to effectively lower the core NA and achieve single-mode or few-mode operation conditions. In doing so, one has to be mindful about signal light that may escape from the core and get trapped within the pedestal, either from offset light injection or from distributed mode filtering. Interaction of such high-order modes with the core region can lead to amplification of these modes at the expense of the fundamental mode. The likelihood of these interactions decreases as the pedestal stretches further away from the dopant region. For example, a pedestal-to-core diameter ratio greater than 3 has been shown to restrict inter-modal coupling and preserve beam quality (N. Simakov et al., Opt. Express Vol. 23, pp. 3126-3133, (2015)).

Fiber manufacturability, however, imposes constraints on the maximum achievable pedestal-to-core diameter ratio, notably for polarization-maintaining fibers with rod-shaped stress-applying parts (SAPs) extending on each side of the core. In addition to the coefficient of thermal expansion (CTE) mismatch between neighboring regions, the induced birefringence is commensurate with the diameter of the rods and the inverse distance from the core. In some cases, sufficient birefringence may only be achieved with a comparatively thin pedestal layer (smaller than three times the core diameter), hence at the expense of mode purity.

There remains a need for multi-clad optical fiber configurations which alleviate at least some of the drawbacks of the prior art.

SUMMARY

In accordance with one aspect, there is provided a multi-clad optical fiber comprising, concentrically and radially outwards from a center axis of the optical fiber:

a core configured to guide a light signal in a core mode, the core having a core diameter $d_{core}$ smaller than about 30 μm, the core being doped with at least one rare-earth dopant material providing amplification of the light signal, the core having a refractive index $n_{core}$;

a pedestal cladding structure supporting light propagation in a plurality of pedestal modes, the pedestal cladding structure having a pedestal cladding structure diameter $d_{pcs}$, a ratio of the pedestal cladding structure diameter $d_{pcs}$ to the core diameter $d_{core}$ being smaller than about 3, the pedestal cladding structure comprising:

a pedestal layer contiguously surrounding the core and configured to confine the light signal in said core mode, the pedestal layer having a refractive index $n_{ped}$ smaller than the refractive index of the core $n_{core}$; and a raised index layer contiguously surrounding the pedestal layer and having a thickness $\Delta w$, the raised index layer having a refractive index $n_{ril}$ larger than the refractive index of the pedestal layer $n_{ped}$ and smaller than the refractive index of the core $n_{core}$, the thickness $\Delta w$ and the refractive index $n_{ril}$ of the raised index layer preserving a confinement of the core mode in the core and minimizing an overlap of one or more modes of the plurality of pedestal modes with the core;

an inner cladding having a refractive index $n_{icl}$ smaller than the refractive index $n_{ril}$ of the raised index layer; and an outer cladding having a refractive index $n_{ocl}$ smaller than the refractive index $n_{icl}$ of the inner cladding.

In some implementations, the diameter of the core is between about 10 μm and about 25 μm. In other implementations, the diameter of the core is smaller than about 10 μm.

In some implementations, the core is made of silica and the at least one dopant comprises ytterbium, erbium, thulium or a combination thereof. The core may be co-doped with at least one of aluminum oxide, phosphorus oxide, cerium oxide or fluorine.

In some implementations, the pedestal layer is made of silica doped with at least one index-raising dopant, such as germanium oxide, phosphorus oxide, aluminum oxide, titanium oxide or a combination thereof.

In some implementations, the raised index layer is made of silica doped with at least one index-raising dopant, such as germanium oxide, phosphorus oxide, aluminum oxide, titanium oxide or a combination thereof.

In some implementations, at least one of the core, the pedestal layer, the raised index layer, the inner cladding and the outer cladding has a non-uniform refractive index profile.

In some implementations, the multi-clad optical fiber has a V parameter of less than about 4.

In some implementations, a pair of stress-applying parts extend parallel to the core. The stress-applying parts may be enclosed within the inner cladding. Alternatively, the stress-applying parts may extend within the inner cladding and partially into the pedestal cladding structure.

In some implementations, the one or more modes of the plurality of pedestal modes having a minimized overlap with the core is an $LP_{11}$-like mode.

Other features and advantages of the invention will be better understood upon a reading of embodiments thereof with reference to the appended drawings.

DETAILED DESCRIPTION

In accordance with one aspect, there is provided a multi-clad optical fiber.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the present description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In the present description, when a broad range of numerical values is provided, any possible narrower range within the boundaries of the broader range is also contemplated. For example, if a broad range value of from 0 to 1000 is provided, any narrower range between 0 and 1000 is also contemplated. If a broad range value of from 0 to 1 is mentioned, any narrower range between 0 and 1, i.e. with decimal value, is also contemplated.

Multi-clad optical fibers may for example be used to amplify a light signal in cladding-pumped fiber devices, such as fiber lasers and amplifiers. Such devices are used in a wide range of optical applications in fields such as medicine and surgery, scientific instrumentation, semiconductor device manufacturing, military technology, and industrial material processing. Cladding-pumped fibers can provide high-power and high-quality laser beams and can be implemented in compact, reliable and cost-effective fiber lasers and amplifiers.

Figure 1:
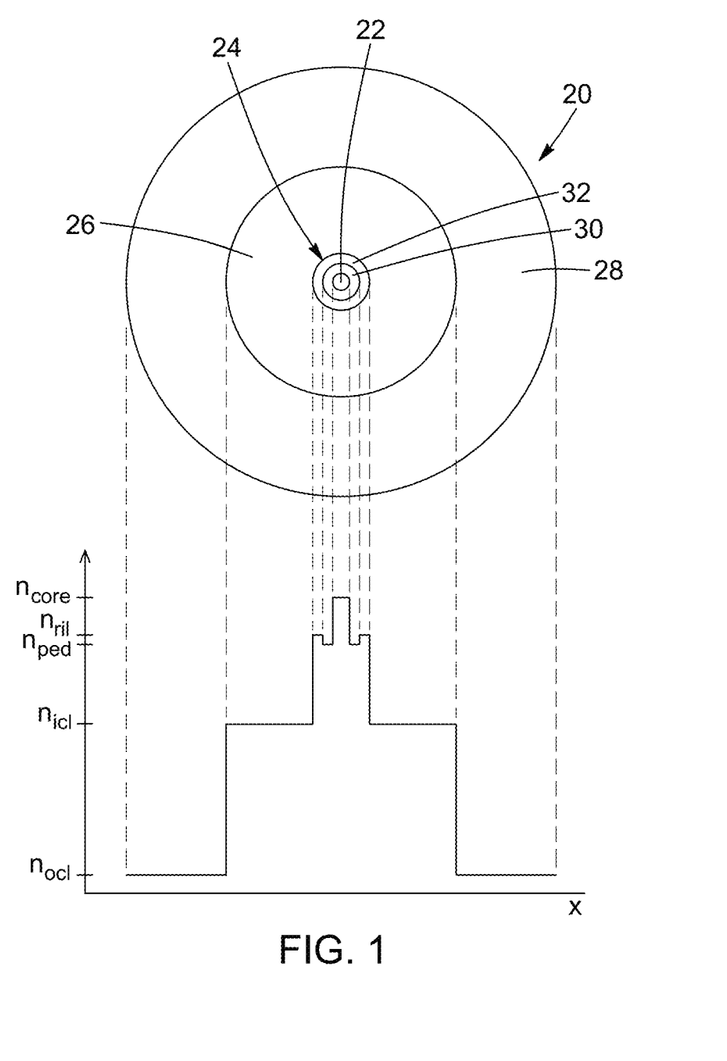
FIG. 1 is a schematized cross-sectional view of a multi-clad optical fiber according to one embodiment, and the corresponding refractive index profile.
Figure 1A:
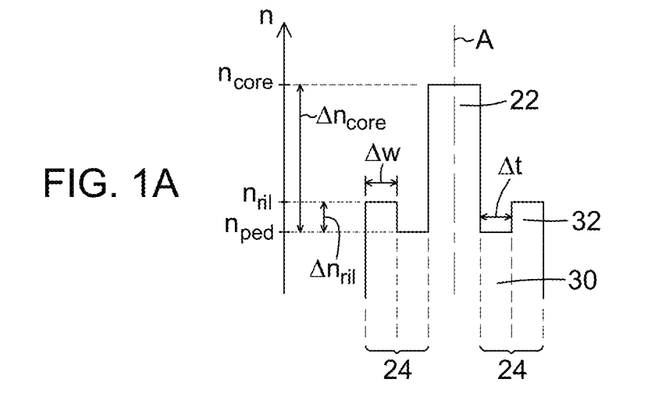
FIG. 1A is an enlarged view of the central portion of the refractive index profile of FIG. 1.

Referring to FIGS. 1 and 1A, the cross-sectional shape and corresponding refractive index profile of a multi-clad optical fiber 20 according to one embodiment is shown. The multi-clad optical fiber 20 generally includes, concentrically and radially outwards from a center axis A of the optical fiber, a core 22, configured to guide and amplify the light signal, a pedestal cladding structure 24, an inner cladding 26 and an outer cladding 28. The pedestal cladding structure is composed of a pedestal layer 30 contiguously surrounding the core 22 and a raised index layer (RIL) 32 contiguously surrounding the pedestal layer 30. The characteristics of each these layers of the multi-clad optical fiber 20 according to some implementations are described further below.

The core 22 of the multi-clad optical fiber 20 is configured to guide the light signal to be amplified in a core mode. The core 22 is preferably made of silica doped with rare-earth ions such as ytterbium, erbium or thulium in oxide form (respectively $Yb_2O_3$, $Er_2O_3$, or $Tm_2O_3$), combinations thereof, or the like. It will be readily understood that the core 22 may also be co-doped with other dopants such as for example aluminum ($Al_2O_3$), phosphorus ($P_2O_5$), cerium ($CeO_2$) oxides or fluorine (F). The core has a refractive index $n_{core}$ determined by its composition, as known in the art. The rare-earth dopant composition and concentration also determine the wavelength or spectral profile of light subjected to amplification when propagating in the core. For example, an Er—Yb co-doped core with concentrations of 0.08 mol-%, 0.79 mol-% and 8.7 mol-% of $Er_2O_3$, $Yb_2O_3$ and $P_2O_5$, respectively, will have a refractive index of $1.4\times10^{-2}$ and will amplify light at a wavelength of 1.55 μm.

The core 22 has a core diameter $d_{core}$. As will be readily understood by one skilled in the art, the core diameter may for example be determined from the power handling requirements of a particular application or context in which the multi-clad optical fiber 20 is destined to be used. In some implementations, the multi-clad optical fiber may be designed for use in low power or medium power amplification applications. As is understood by those skilled in the art, for low power pulsed amplifier applications, a core diameter smaller than about 10 μm is generally adequate, while medium power amplifiers typically require a core diameter of about 10 to about 25 μm, and high power fiber amplifiers will command core diameters larger than about 25 μm. As will be readily understood, amplifiers based on optical fibers having a smaller core diameter are more suitable for earlier amplification stage of a laser amplification cascade, in which the power handled by the core is below the thresholds at which deleterious non-linear effects may arise. Likewise, as the laser power propagating in the fiber core increases, a larger core diameter is required in order to minimize the impact of non-linear effects on the laser system performances.

The pedestal layer 30 has a refractive index of the pedestal layer $n_{ped}$ smaller than the refractive index of the core $n_{core}$, to provide light guidance within the core, that is, to confine the light signal in a core mode. As known in the art, providing a "pedestal" of intermediate refractive index between the core and inner cladding of a clad-pumped optical fiber allows reducing the numerical aperture NA of the core. The core numerical aperture $NA_{core}$ depends on the effective refractive indices of the core $n_{core}$ and of the pedestal layer $n_{ped}$ as the contiguous layer, according to:

$$NA_{core} = \sqrt{n_{core}^2 - n_{ped}^2} \quad (1)$$

The pedestal layer 30 may for example be made of silica doped with index-raising dopants such as germanium ($GeO_2$), phosphorus ($P_2O_5$), aluminum ($Al_2O_3$) or titanium ($TiO_2$) oxides.

The inner cladding 26 may for example be made of pure silica glass ($SiO_2$) or silica glass doped with index raising dopants such as germanium ($GeO_2$), phosphorus ($P_2O_5$), aluminum ($Al_2O_3$) or titanium ($TiO_2$) oxides, or doped with index decreasing dopants such as fluorine (F). In some implementations, the inner cladding 26 has a diameter of 125, 250, or 400 μm. The outer cladding 28 may for example be made of fluorinated silica glass, fluoroacrylate polymer or the like. In some implementations, the outer cladding 28 has a thickness between 10 μm and 30 μm. The inner and outer claddings 26 and 28 have respective refractive indices $n_{icl}$ and $n_{ocl}$ related to their respective compositions and dopings. As will be readily understood by one skilled in the art, the compositions and dopings of the inner and outer claddings 26 and 28 are selected so that the refractive index of the outer cladding $n_{ocl}$ is lower than the refractive index of the inner cladding $n_{icl}$ to provide confinement of pump light within the inner cladding 26.

Although not shown in the drawings, a polymer coating, jacket, or other protective layer may be applied on the outer cladding to ensure the mechanical integrity of the optical fiber, as well known in the art.

Referring more particularly to FIG. 1A, as mentioned above, the multi-clad optical fiber includes a pedestal cladding structure 24 which is composed of the pedestal layer 30 and the raised index layer 32. The raised index layer 32 contiguously surrounds the pedestal layer 30 and has a refractive index $n_{ril}$. The raised index layer 32 is preferably made of silica doped with at least one index-raising dopant such as germanium ($GeO_2$), phosphorus ($P_2O_5$), aluminum ($Al_2O_3$) or titanium ($TiO_2$) oxides. The composition and concentration of these dopants is selected to provide the desired resulting refractive index $n_{ril}$. For example, a $GeO_2$ concentration of 8.0 mol-% in an $SiO_2$ matrix leads to a refractive index increase of $10.5 \times 10^{-3}$.

The refractive index of the raised index layer $n_{ril}$ is larger than the refractive index of the pedestal layer $n_{ped}$, and larger than the refractive index of the inner cladding $n_{icl}$, which is larger than the refractive index of the outer cladding layer $n_{ocl}$ so that the pump light beam remains confined within the inner cladding. The relative values of the refractive indices of the various layers of the multi-clad optical fiber 20 can be expressed mathematically as follows:

$$n_{core} > n_{ril} > n_{ped} > n_{icl} > n_{ocl} \quad (2)$$

The raised index layer 32 has a thickness Δw and the pedestal layer has a thickness Δt. The pedestal cladding structure 24 has a pedestal cladding structure diameter $d_{pcs}$ corresponding to the outer diameter of the raised index layer 32. Preferably, the pedestal cladding structure 24 is substantially thinner than the inner cladding 26. In some embodiments, the ratio of the pedestal cladding structure diameter $d_{pcs}$ to the core diameter $d_{core}$ is smaller than about 3, including values close to 3, which can be expressed as:

$$d_{pcs}/d_{core} \leq 3 \quad (3)$$

Advantageously, favoring a relatively thin pedestal cladding structure facilitates the manufacturing of the optical fiber and therefore reduces manufacturing complexity and costs.

Figure 7A:
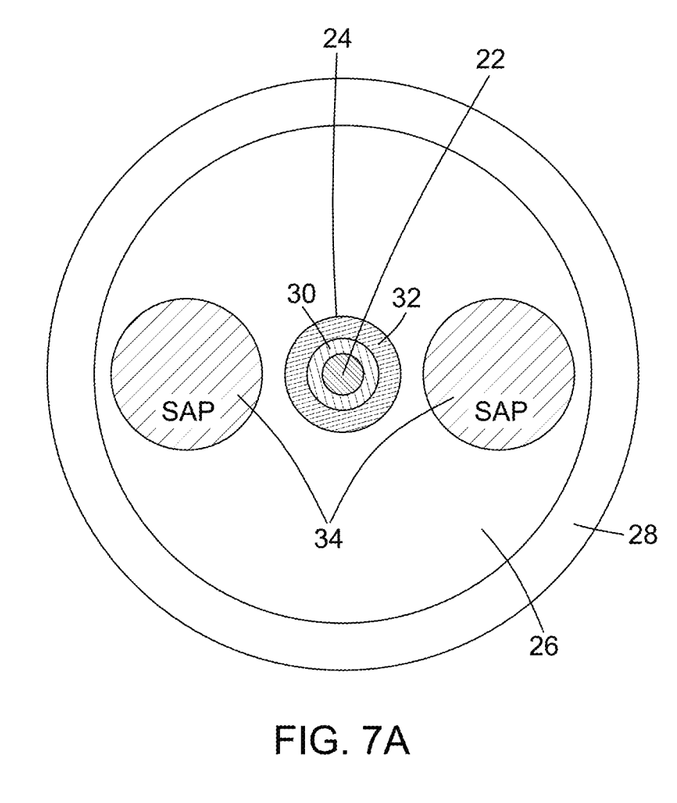
FIGS. 7A and 7B are schematized cross-sectional views of multi-clad optical fibers according to embodiments provided with a pair of stress-applying parts, the stress-applying parts being either enclosed within the inner cladding (FIG. 7A) or extending within the inner cladding and partially into the pedestal cladding structure (FIG. 7B).
Figure 7B:
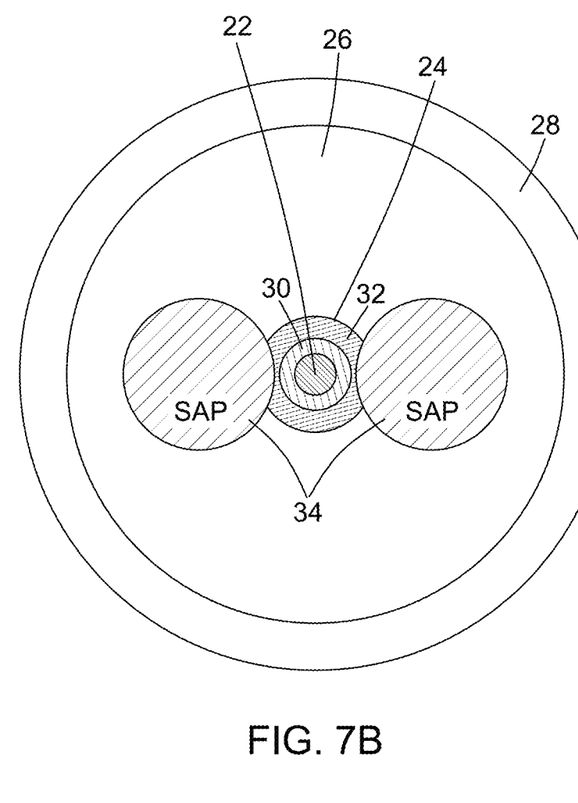

Furthermore, a thin pedestal cladding structure also has advantages in the manufacturing of polarization-maintaining fibers, according to some embodiments. By way of example, the so-called "panda-design" for polarization-maintaining fibers involves the introduction of stress-applying parts (SAPs) within the inner cladding, the SAPs extending parallel to the core. SAPs are typically provided by drilling channels in the preform used to make the fiber and then inserting rods made of a suitable material within those channels. Referring to FIGS. 7A and 7B, in some implementations the multi-clad optical fiber 20 therefore includes a pair of SAPs 34 extending parallel to the core 22. The SAPs 34 are for example made of boron-doped silica. In some variants, such as shown in FIG. 7A, the SAPs 34 are enclosed within the inner cladding 26. In other variants, such as shown in FIG. 7B, the SAPs 34 extend within the inner cladding 26 and partially into the pedestal cladding structure 24. In either case, the provision of a thin pedestal cladding structure 24 allows to minimize the overlap of the SAPs 34 with the doped regions of the fiber, providing for larger dopant concentration in the layers of the pedestal cladding structure.

Although the refractive index profile illustrated in FIG. 1 involves a step index design, it will be readily understood that in some embodiments any one of the core, pedestal layer, raised index layer, inner or outer cladding may have a non-uniform refractive index without departing from the scope of protection. For example, in some embodiments, the composition of the core may not be uniform. In some implementations, the dopant or co-dopant concentration in the core may vary radially, resulting in a non-uniform refractive index profile, such as a convex or paraboloidal shape. In other variants, the raised index layer or another one of the layers of the multi-clad optical fiber may have a complex design including multiple rings of different refractive indices.

In accordance with one aspect, parameters of the core and pedestal cladding structure 24 are selected to favor a delocalization of the high-order propagation modes in the multi-clad optical fiber 20. It will be understood in the context of the present description that the expression "mode" refers to a transverse mode supported by the optical fiber. These parameters may include the refractive indices $n_{core}$, $n_{ped}$ and $n_{ril}$, the thicknesses Δt and Δw as well as the diameters $d_{core}$ and $d_{pcs}$. The index elevation of the core with respect to the pedestal layer $\Delta n_{core} = n_{core} - n_{ped}$ and the incremental index of the raised index layer relative to the pedestal layer $\Delta n_{ril} = n_{ril} - n_{ped}$ may also be parameters of interest.

The number of core modes supported by an optical fiber is generally quantified by the dimensionless so-called "V parameter", whose definition is:

$$V = \frac{\pi d_{core}}{\lambda} NA_{core} \qquad (4)$$

A step-index core fiber is considered to be purely single-mode for values of the V parameter smaller than 2.405. In some implementations, the multi-clad optical fiber is indeed purely single-mode, the core mode guided and amplified in the core therefore corresponding to the fundamental mode. In other implementations, the multi-clad optical fiber 20 may have a V parameter of less than about 4, therefore supporting other core modes in addition to the fundamental mode.

In the prior art of PARÉ et al. (patent U.S. Pat. No. 8,731,358), it is taught that the provision of a "depressed cladding" surrounding the core of Large-Mode-Area (LMA) multi-clad optical fibers enables the coupling of high-order core modes out of the fiber core through bending losses, preserving mostly the fundamental mode and therefore the benefits of single-mode operation. This solution, however, is beneficial mainly for fibers having a large core diameter greater than 30 µm, and a corresponding V parameter of about 4 or more. For optical fibers having a smaller core diameter and numerical aperture, such as in the embodiments of the multi-clad optical fiber described herein, the extraction of the high-order modes from the core through bending losses is less challenging and the depressed cladding feature is not required to obtain a good output mode quality from the amplifying fiber.

The pedestal cladding structure 24 usually supports light propagation in a plurality of propagation modes. These modes are referred herein to as pedestal modes, and they typically overlap with both the core 22 and pedestal cladding structure 24.

In accordance with some implementations, the delocalization of the pedestal modes is used to mitigate the impact of the presence of these pedestal modes in a multi-clad optical fiber having a core 22 of small diameter and a thin pedestal cladding structure 24, as explained above. As one skilled in the art will understand the delocalized pedestal modes can have a small overlap with the core 22 of the optical fiber 20, therefore minimizing their interaction with the rare-earth dopants of the core. Advantageously, this reduces the probability of amplification of the pedestal modes, detrimental to the output mode quality, and may preserve the available gain to favor the amplification of the fundamental core mode.

Several factors may be taken into account in designing multi-clad optical fibers according to the embodiments described herein.

Typically, such a design may use the desired core diameter $d_{core}$ and core numerical aperture $NA_{core}$ (and hence the refractive indices of the core and pedestal layer $n_{core}$ and $n_{ped}$) as a starting point. These parameters may be dictated by the intended use of the multi-clad optical fiber. For example, $d_{core}=10$ µm and $NA_{core}=0.08$ are appropriate parameters to obtain a single-mode Yb-doped fiber for operation at a wavelength of 1.06 µm. The thicknesses and compositions of the inner cladding and outer cladding and of any additional protective layer may also be dictated by the intended use.

As mentioned above, the pedestal cladding structure diameter $d_{pcs}$ preferably has a value small enough so that its ratio to the core diameter $d_{core}$ is smaller than about 3. Such a ratio can be understood as providing a "thin pedestal", especially for small values of $d_{core}$ such as considered herein. As will be understood by one skilled in the art, such a small pedestal-to-core diameter ratio can lead to inter-modal coupling and poor beam quality. However, it will be seen that the pedestal mode delocalization discussed herein can sidestep this issue and provide the advantages of a thin pedestal while preserving the beam quality.

The pedestal cladding structure diameter $d_{pcs}$ can be determined taking into account possible fabrication constraints on the preform used to draw the multi-clad optical fiber. For example, any limitation on the pedestal thickness by MCVD or similar deposition techniques may lead to favoring a thin pedestal design, as explained above. Furthermore, the available space in the optical fiber preform may be a concern, for example in the case of a highly stressed multi-clad preform design in which the chemical composition of the pedestal cladding structure forbids drilling partly or completely within the pedestal cladding structure for further insertion of the SAPs required in the fabrication of panda-type polarization-maintaining fibers.

In some implementations, a minimum acceptable value of the thickness of the pedestal layer Δt may be determined through numerical simulations in such a way that the presence of the raised index layer shall not impact the confinement of the core fundamental mode, whether or not the multi-clad optical fiber is coiled. In some implementations, the chosen value of Δt is preferably the minimum acceptable value of Δt, within a safety margin. The value of the thickness of the raised index layer Δw may then be determined based on the remaining available space in the pedestal cladding structure once a value of Δt is selected.

In some implementations, an optimization of $\Delta n_{ril}=n_{ril}-n_{ped}$ is performed through numerical calculations, with the objective of minimizing the spatial overlap of one or more pedestal modes, with the gain region of the core of the multi-clad optical fiber, while ensuring that the presence of the raised index layer does not impact on the confinement of the fundamental core mode in the core. Suitable tools and techniques for such numerical calculations are known to those skilled in the art, such as for example finite-difference mode solvers or beam propagation methods based on iterative spatial/spectral domain calculations. From the discussion above, it will be understood that in typical implementations the value of $n_{ped}$ is predetermined in view of the desired core numerical aperture, and that optimizing $\Delta n_{ril}$ therefore involves finding an optimal value for $n_{ril}$.

Figure 2:
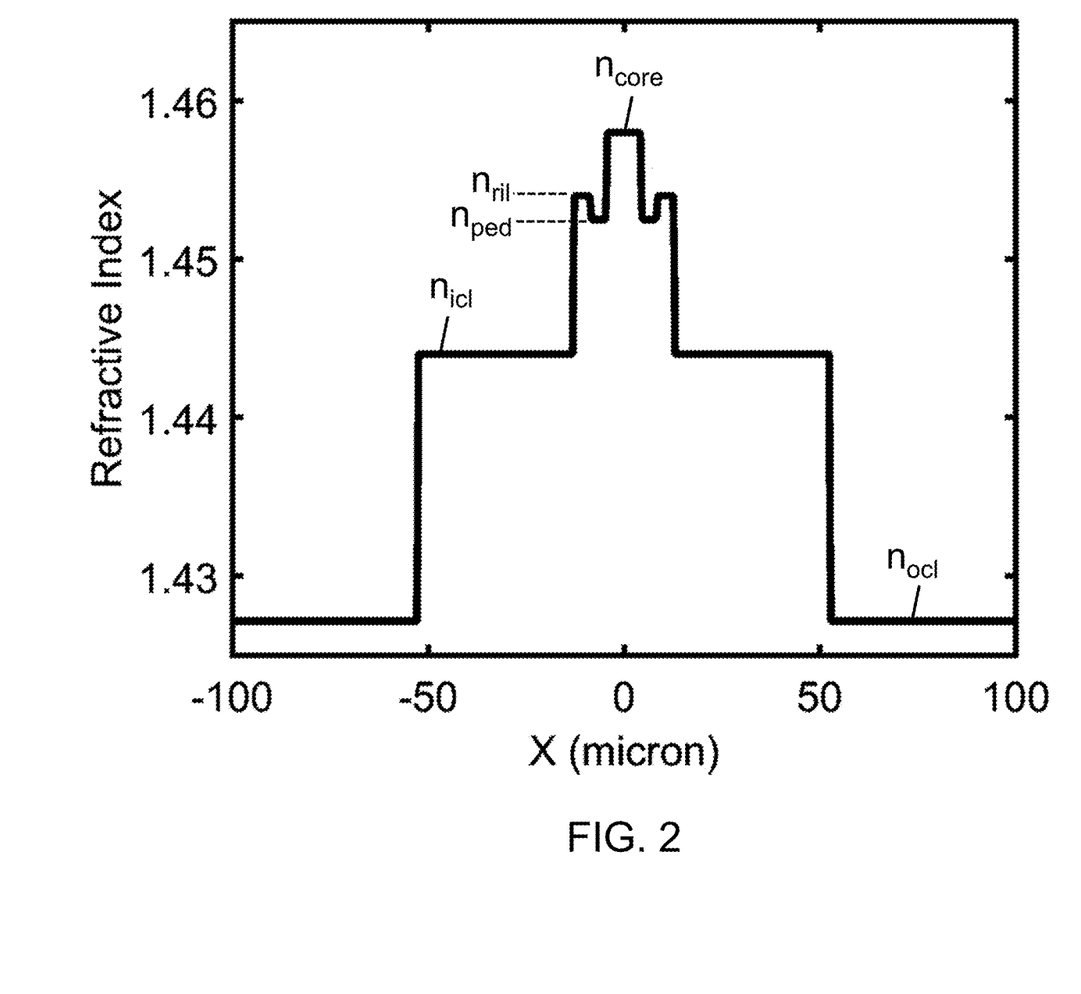
FIG. 2 shows the computed radial refractive index profile of a multi-clad fiber according to one embodiment.

Referring to FIG. 2, the simulated refractive index profile of a multi-clad optical fiber according to one example is illustrated. The X axis represents the radial position along the cross-section of the optical fiber, the position X=0 corresponding to the center axis of the fiber. As readily understood by one skilled in the art, optical fibers generally have a circularly symmetrical radial profile about their center axis. In this example, a core of Er—Yb—P co-doped silica glass having a core diameter $d_{core}$ of 8.5 µm and a refractive index of $n_{core}=1.4579$ has been considered. The refractive index of the pedestal layer of the pedestal cladding structure was set to $n_{ped}=1.4525$, leading to a core numerical aperture of $NA_{core}=0.125$, and its thickness Δt was set to 4.25 µm. The refractive index $n_{ril}$ and thickness Δw of the raised index layer were set to 1.4545 and 4.25 µm, respectively. The refractive indices or the inner cladding $n_{icl}$ and outer cladding $n_{ocl}$ are equal to 1.4440 and 1.4271, respectively. In this example, the parameters of the core and of the pedestal cladding structure were adjusted such that the spatial profile of the fundamental mode of the core matches the mode of a standard PM1550 fiber (MFD=10.1/10.5±0.5 depending upon the manufacturer).

Figure 3A:
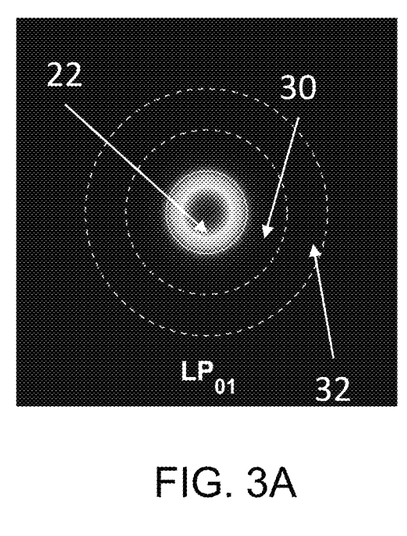
FIGS. 3A to 3C show the color-coded spatial distribution of the $LP_{01}$, $LP_{11}$ and $LP_{12}$ mode, respectively, for a multi-clad optical fiber having the refractive index profile shown in FIG. 2.
Figure 3B:
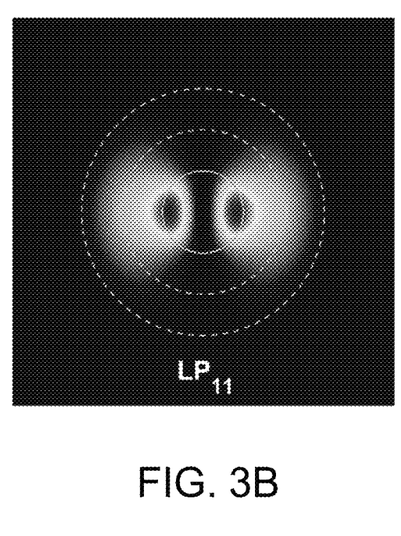
Figure 3C:
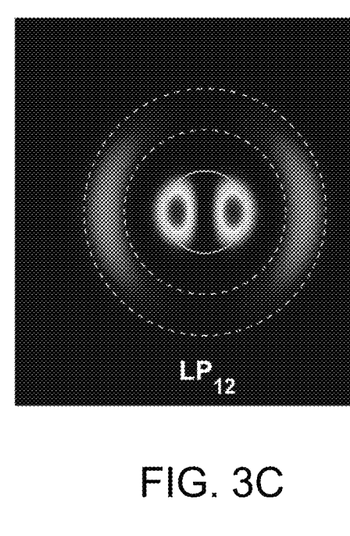

The spatial energy distributions of three of the lower-order modes of a multi-clad optical fiber having the refractive index profile shown in FIG. 2 are illustrated in FIGS. 3A to 3C. As can be observed, the fundamental mode $LP_{01}$ is confined within the center region of the core 22 where it can be amplified by the gain provided by the optically-pumped rare-earth dopants present therein. The $LP_{11}$ mode, however, is mostly confined within the pedestal layer 30 near the boundary of the core 22, and has very little overlap with the core 22. The overlap of the first few pedestal modes with the core region is considered a parameter of interest and provides indication on which modes should be monitored in subsequent analyses.

Figure 4:
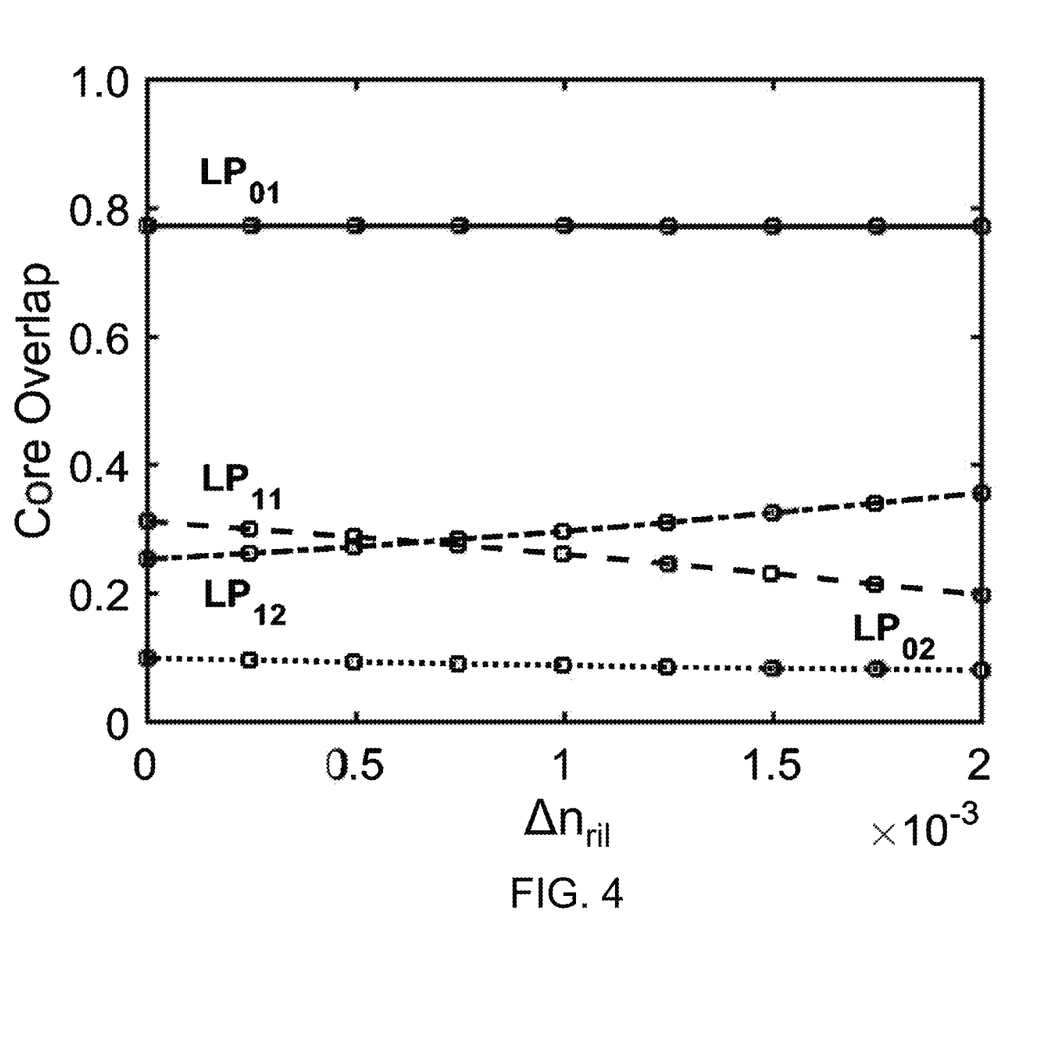
FIG. 4 is a graph showing the spatial overlap of the $LP_{01}$, $LP_{11}$, $LP_{12}$ and $LP_{02}$ modes with the core for a multi-clad optical fiber having the refractive index profile shown in FIG. 2, as a function of the raised-index layer index elevation $\Delta n_{ril}$.
Figure 5A:
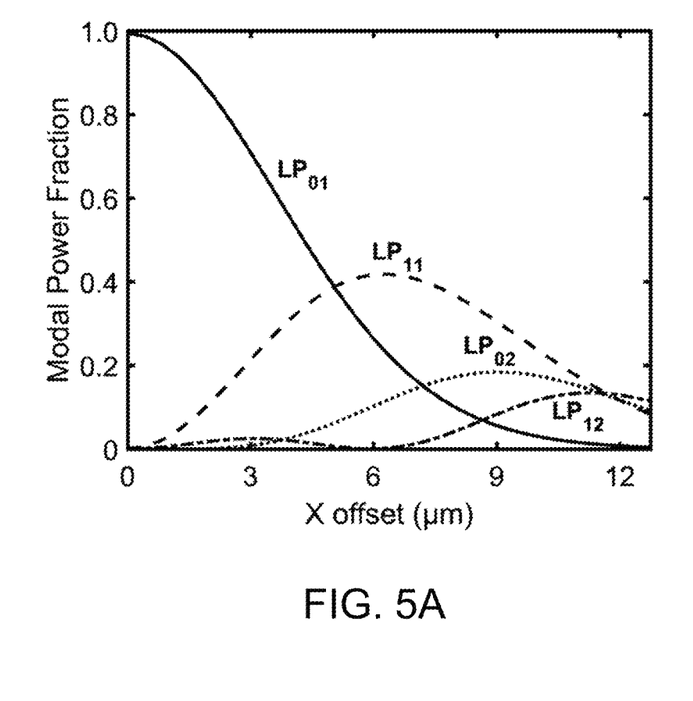
FIGS. 5A and 5B show the excitation of the first few modes of a multi-clad fiber having the refractive index profile shown in FIG. 2, as a function of the lateral offset (FIG. 5A) and angular offset (FIG. 5B) of an incident mode-matched Gaussian beam.
Figure 5B:
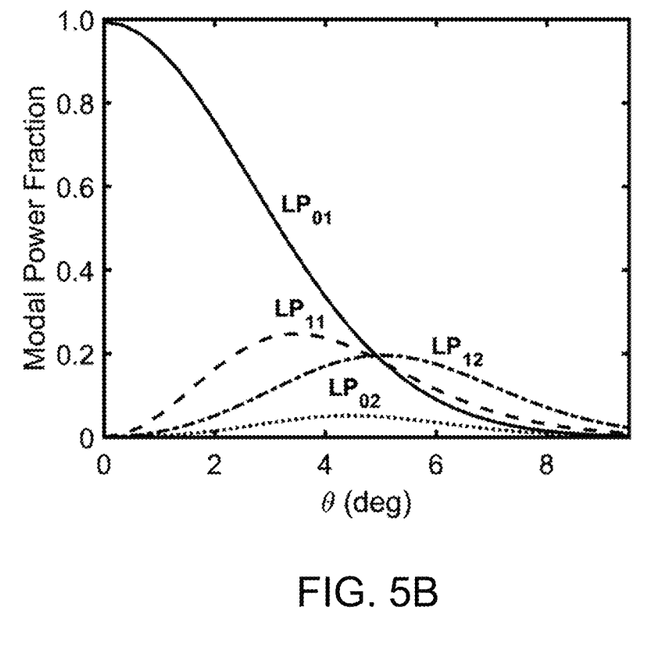

Referring to FIG. 4, the overlap of four of the lower-order modes with the core of a multi-clad optical fiber having the refractive index profile shown in FIG. 2 is plotted as a function of the raised-index layer index elevation $\Delta n_{ril}$ (which can be varied by changing the refractive index of the raised index layer $n_{ril}$ for a given value of the refractive index of the core $n_{core}$ and pedestal $n_{ped}$). It can be observed that the overlap of the $LP_{11}$-like mode with the rare-earth doped region of the core decreases with increased index elevation $\Delta n_{ril}$, which provides an efficient delocalization of these modes for larger values of $\Delta n_{ril}$. On the other hand, the overlap of the $LP_{12}$-like mode with the core is seen to increase as the index elevation $\Delta n_{ril}$ gets larger. In the example of FIG. 4, the $LP_{12}$-like mode is however less of a concern, as it is less likely to get excited as light is injected into the fiber. This can be seen from FIGS. 5A and 5B, where the $LP_{12}$-like mode is only present when light is made incident on the input end of the fiber with a large lateral offset and/or an important tilt angle, which are rather unlikely when the fiber is handled using state-of-the art techniques. Overall, superior mode purity is expected at the amplifier output as a result of the fiber design proposed herein. One skilled in the art will understand that reference to "$LP_{ii}$-like modes" in the context of the present description is meant to convey that these propagation modes are akin to LP modes conventionally guided in the core of an optical fiber, while begin confined here within the pedestal cladding structure.

Figure 6A:
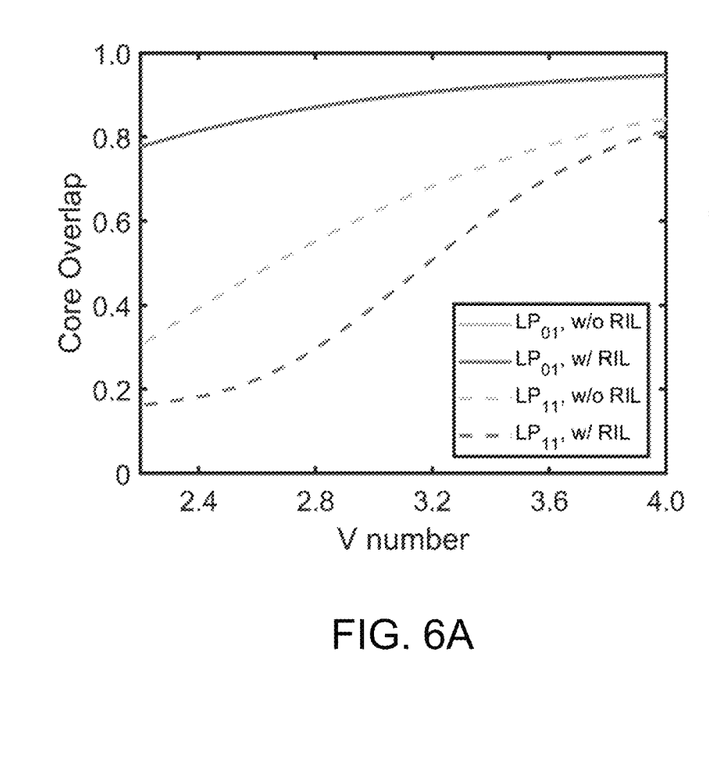
FIGS. 6A and 6B respectively show the overlap with core for the $LP_{01}$ and $LP_{11}$ modes and the effective mode area for the $LP_{01}$ mode as a function of the dimensionless parameter V for a multi-clad fiber having the refractive index profile shown in FIG. 2.
Figure 6B:
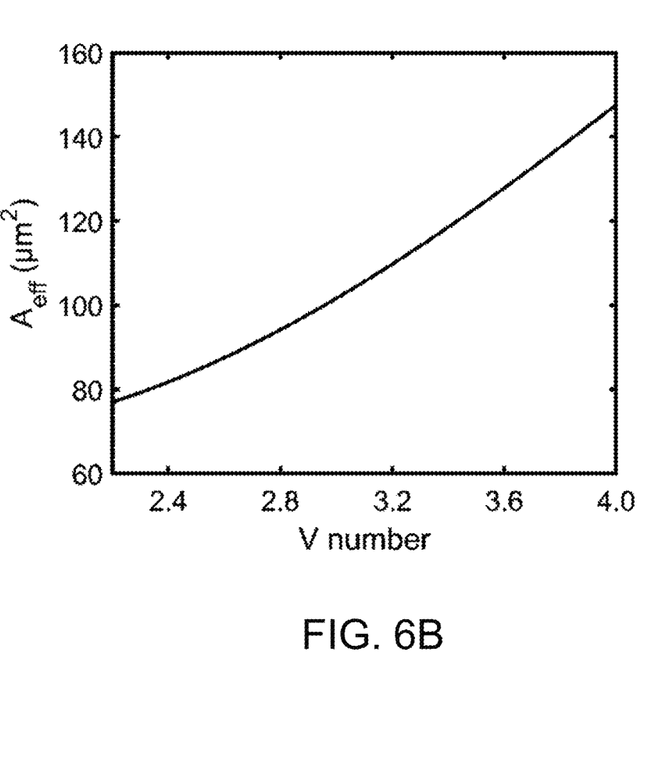

FIGS. 6A and 6B respectively illustrate the computed spatial overlap of the $LP_{01}$ and $LP_{11}$ modes with the core (FIG. 6A) and the effective mode area of the $LP_{01}$ fundamental mode (FIG. 6B) as a function of the dimensionless parameter V. These results still hold for an optical fiber having the refractive index profile shown in FIG. 2, with $d_{core}$=8.5 µm, $NA_{core}$=0.125, $\Delta n_{ril}$=2.5×10$^{-3}$, and $\Delta w$=4.5 µm. The curves allow the comparison with a fiber having similar parameters but devoid of raised index layer. As can be seen, the curves showing the $LP_{01}$ mode with and without the raised index layer are superimposed, as the addition of the raised index layer does not have any impact on the confinement of the fundamental mode. However, the benefit brought by the raised index layer can clearly be seen from a comparison of the core overlap of the $LP_{11}$ mode of the fiber with and without the raised index layer. The raised index layer is seen to yield an increased differential overlap of the $LP_{01}$ and $LP_{11}$-like modes with the rare-earth doped region for dimensionless V parameter scaling up from 2 to approximately 4, i.e. well over the single-mode cut-off at V≈2.405. For V parameter values close to this single-mode cutoff, it can be seen in FIG. 6A that the $LP_{11}$ mode overlap with the core is about half that of an identical fiber without a RIL. FIG. 6A suggests that the benefits related to the RIL structure are diminishing as the dimensionless V parameter of the core increases up to 4, this latter value being typically associated to LMA fibers for which the core high-order modes extraction through bending losses, such as described in U.S. Pat. No. 8,731,358, may provide a better way for ensuring mode purity.

The presence of the raised-index layer also allows to preserve a low core overlap for the $LP_{11}$ mode as the V parameter is increased by enlarging the core. For example, compared to a single-mode fiber (V≈2.405) without a RIL structure, the same core overlap for the $LP_{11}$ mode is achieved for a fiber with a V parameter of about 3 (see FIG. 6A). This corresponds to a core diameter increasing from 9.5 µm to 12 µm, leading to an effective mode area of ~100 µm$^2$ (see FIG. 6B), which represents a 35% increase. In other words, the addition of the raised-index layer to a nearly single-mode fiber with a pedestal provides a single-mode behavior comparable to that of a truly single-mode fiber having a smaller effective mode area. The possibility to use fibers with larger mode area while preserving a single-mode character is a significant advantage for laser system engineers, who are often concerned with the mitigation of nonlinear effects. Accordingly, the optical fibers disclosed herein could likely be implemented in laser systems and laser amplifiers to yield output beams of higher power/energy.

Of course, numerous modifications could be made to the embodiments described above without departing from the scope of protection.

The invention claimed is:

1. A cladding-pumped multi-clad optical fiber comprising, concentrically and radially outwards from a center axis of the optical fiber:

a core configured to guide a light signal in a core mode, said core having a core diameter $d_{core}$ smaller than about 30 µm, the core being doped with at least one rare-earth dopant material providing amplification of the light signal, the core having a refractive index $n_{core}$;

a pedestal cladding structure supporting light propagation in a plurality of pedestal modes, the pedestal cladding structure having a pedestal cladding structure diameter $d_{pcs}$, the pedestal cladding structure comprising:

a pedestal layer contiguously surrounding the core and configured to confine the light signal in said core mode, the pedestal layer having a refractive index $n_{ped}$ smaller than the refractive index of the core $n_{core}$; and a raised index layer contiguously surrounding the pedestal layer and having a thickness $\Delta w$, the raised index layer having a refractive index $n_{ril}$ larger than the refractive index of the pedestal layer $n_{ped}$ and smaller than the refractive index of the core $n_{core}$, the thickness $\Delta w$ and the refractive index $n_{ril}$ of the raised index layer preserving a confinement of the core mode in the core;

an inner cladding having a refractive index $n_{icl}$ smaller than the refractive index $n_{ril}$ of the raised index layer; and an outer cladding having a refractive index $n_{ocl}$ smaller than the refractive index $n_{icl}$ of the inner cladding;

wherein the pedestal cladding structure is a thin pedestal cladding structure characterized by a ratio of the pedestal cladding structure diameter $d_{pcs}$ to the core diameter $d_{core}$ smaller than about 3, and the thickness $\Delta w$ and the refractive index $n_{ril}$ of the raised index layer minimize an overlap of one or more modes of the plurality of pedestal modes with the core to reduce a probability of amplification of the pedestal modes without requiring extraction of said pedestal modes.

2. The multi-clad optical fiber according to claim 1, wherein the diameter of the core is between about 10 μm and about 25 μm.

3. The multi-clad optical fiber according to claim 1, wherein the diameter of the core is smaller than about 10 μm.

4. The multi-clad optical fiber according to claim 1, wherein the core is made of silica and the at least one dopant material comprises ytterbium, erbium, thulium or a combination thereof.

5. The multi-clad optical fiber according to claim 4, wherein the core is co-doped with at least one of aluminum oxide, phosphorus oxide, cerium oxide and fluorine.

6. The multi-clad optical fiber according to claim 1, wherein the pedestal layer is made of silica doped with at least one index-raising dopant.

7. The multi-clad optical fiber of claim 6, wherein the at least one index-raising dopant of the pedestal layer comprises germanium oxide, phosphorus oxide, aluminum oxide, titanium oxide or a combination thereof.

8. The multi-clad optical fiber according claim 1, wherein the raised index layer is made of silica doped with at least one index-raising dopant.

9. The multi-clad optical fiber of claim 8, wherein the at least one index-raising dopant of the raised index layer comprises germanium oxide, phosphorus oxide, aluminum oxide, titanium oxide or a combination thereof.

10. The multi-clad optical fiber according to claim 1, wherein at least one of the core, the pedestal layer, the raised index layer, the inner cladding and the outer cladding has a non-uniform refractive index profile.

11. The multi-clad optical fiber according to claim 1, having a V parameter of less than about 4.

12. The multi-clad optical fiber according to claim 1, comprising a pair of stress-applying parts extending parallel to the core.

13. The multi-clad optical fiber according to claim 12, wherein the stress-applying parts are enclosed within the inner cladding.

14. The multi-clad optical fiber according to claim 12, wherein the stress-applying parts extend within the inner cladding and partially into the pedestal cladding structure.

15. The multi-clad optical fiber according to claim 1, wherein the one or more modes of the plurality of pedestal modes having a minimized overlap with the core is an $LP_{11}$-like mode.

* * * * *